Dec. 3, 1935.  B. GUNDERSON  2,023,071
PROGRESSIVE DISTRIBUTING LUBRICATOR
Filed July 10, 1933  2 Sheets-Sheet 1
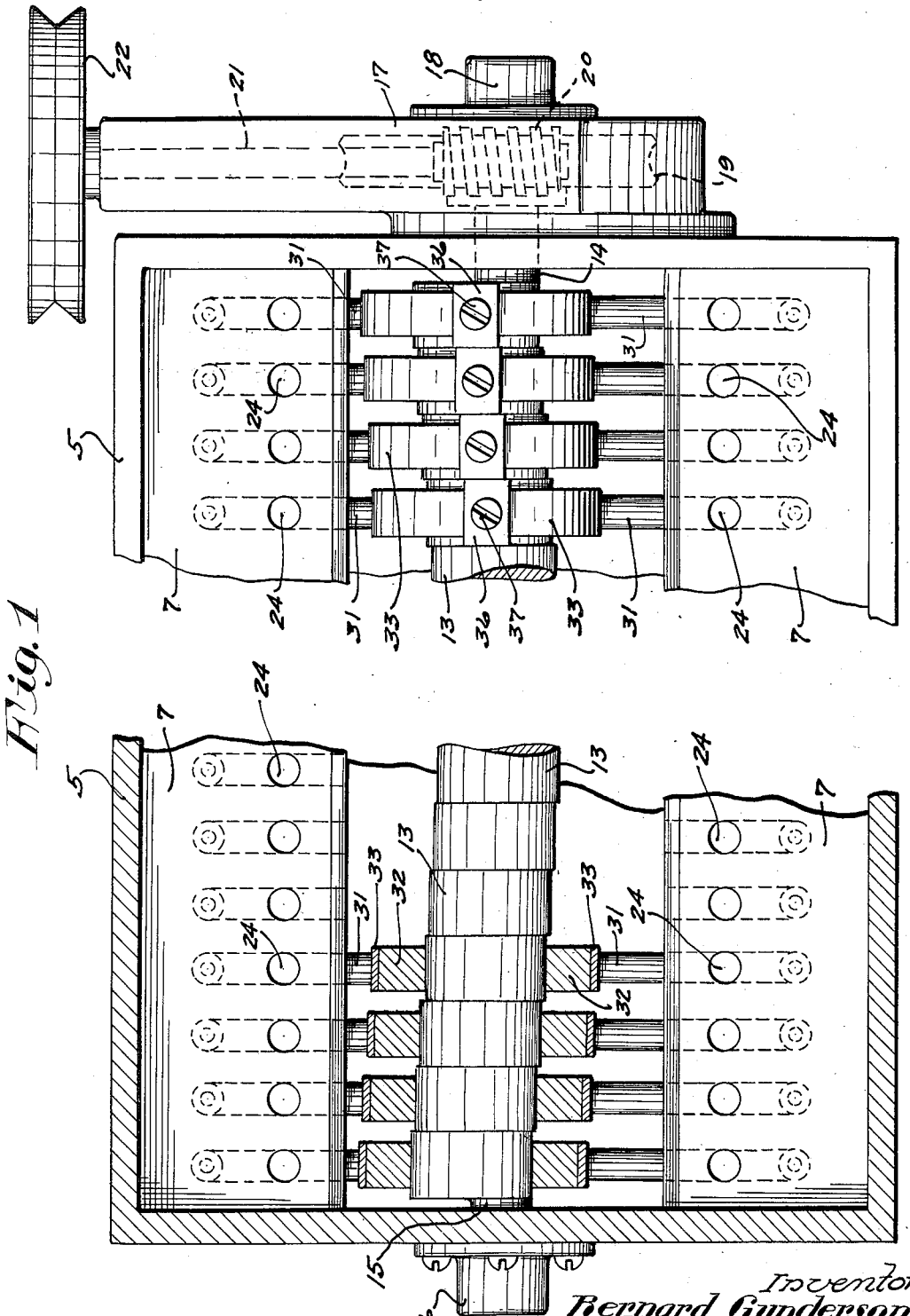
Inventor
Bernard Gunderson
By his Attorneys

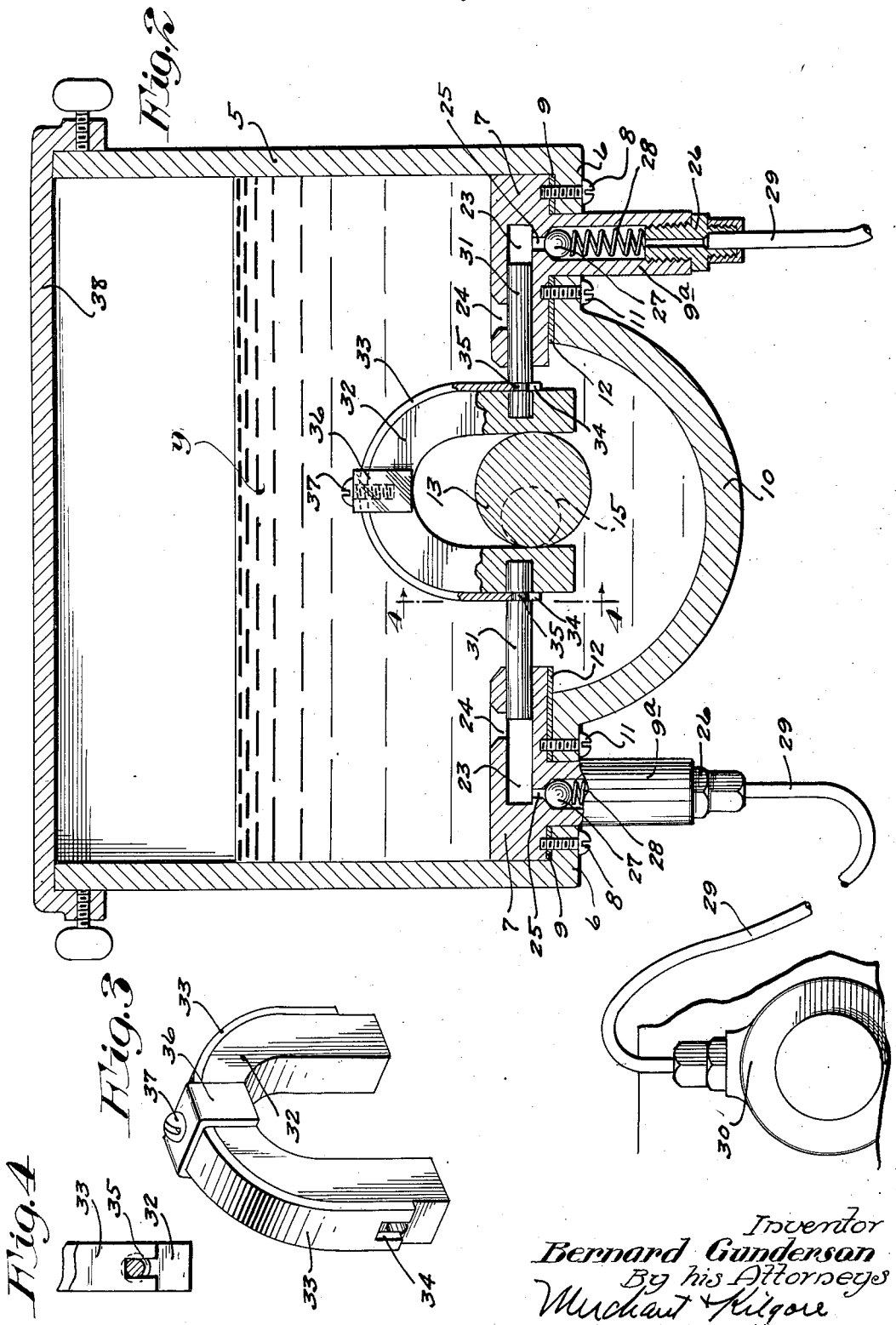

Patented Dec. 3, 1935

2,023,071

UNITED STATES PATENT OFFICE 2,023,071

PROGRESSIVE DISTRIBUTING LUBRICATOR

Bernard Gunderson, St. Paul, Minn., assignor of one-half to Jennie C. Robinson, St. Paul, Minn.

Application July 10, 1933, Serial No. 679,737

4 Claims. (Cl. 184—27)

My invention provides an improved multiple distributing lubricator of the progressively operative type and, generally stated, consists of the novel devices, combinations of devices and arrangement of parts hereinafter described and defined in the claims. This improved lubricator, in its complete and approved form, comprises a plurality of lubricant pumps of the cylinder and piston type opposed or diametrically arranged in respect to an interposed multiple cam crank shaft in which the crank shaft and co-operating pump-actuating elements are arranged to work submerged in the oil or lubricant container from which the supply of lubricant to the pumps is obtained. In this arrangement, the friction and wear is reduced to a minimum, the thrust or reaction from the lubricant pumps on the crank shaft is neutralized, and the various lubricant delivery pipes or conduits are arranged to receive lubricant from the respective lubricant pumps successively and in a progressive order. The invention further involves minor but important novel features, all of which, as well as those above enumerated, will more fully appear in the description of a commercial form of the lubricator illustrated in the accompanying drawings, wherein like characters indicate like parts throughout the several views.

Referring to the drawings:

Fig. 1 is a view partly in full plan and partly in horizontal section and with some parts broken away, showing the improved lubricator;

Fig. 2 is a vertical section taken approximately through the lubricator, some parts being shown in full, and showing one of the lubricant pumps of the series connected to the journal to be lubricated;

Fig. 3 is a detail showing one of the plunger-actuating yokes or heads removed from the lubricator; and Fig. 4 is a fragmentary section taken on the line 4—4 of Fig. 2.

The oil or grease $y$ is contained in a reservoir 5 which is preferably a metallic rectangular box-like structure, the longitudinal sides of which, at the bottom, are formed with inwardly projected flanges 6. Heavy metal bars 7 rest upon and are rigidly secured to the flanges 6 by suitable means, such as machine screws 8. The numeral 9 indicates a packing strip interposed between the elements 6 and 7 to form oil tight joints. These bars 7 are provided with heavy depending longitudinally extended flanges, $9^a$, the purpose of which will presently appear. A depressed bottom-forming member, shown as in the form of an approximately semicylindrical casing 10 is rigidly but detachably secured to the inwardly projecting portions of the bars 7 by suitable means such as machine screws 11. The numeral 12 indicates packing strips interposed between the members 7 and 10 to form oil tight joints. Located midway between and extended parallel to the inner edges of the bars 7 is a heavy crank shaft which, as shown, and preferably, comprises a multiplicity of integrally cast or formed metallic eccentric pump-actuating cams 13 and end trunnions 14 and 15. The trunnion 15 is journaled in a closed bearing box 16 detachably secured to an end plate of the reservoir 5 and having a closed outer end. The trunnion or shaft end 14, in the arrangement illustrated, is extended into a housing 17 rigidly secured to the adjacent end plate of the reservoir and the outer end of said trunnion is journaled in a closed bearing box 18 secured to said housing 17.

The crank shaft described may be given the desired slow motion in various different ways, but for that purpose is shown as provided with a worm gear 19 engaged by a worm 20 secured on a shaft 21 journaled in the housing 17 and shown as provided with a pulley 22, over which a power-driven belt, not shown, is adapted to be run. The above noted elements 19 and 20 are shown only by dotted lines in Fig. 1.

The bars 7 above noted are formed with lubricant pump barrels or cylinders 23 that are closely spaced in parallel arrangement with each barrel 23 aligned with the corresponding barrel of the opposite or opposed bar 7. Each barrel 23 is provided with a lubricant intake port 24 and a lubricant outlet port 25. Immediately below each port 25, the depending flange or rib 9 is bored out to receive a pipe coupling 26. Each port 25 is normally closed against backward flow of oil by a check valve shown as in the form of a ball 27, subject to a light compressed spring 28.

The several lubricant pumps are arranged to deliver lubricant to different places, such as different bearings, journals or the like, and hence each pipe coupling 26 is connected to the receiving end of a lubricant delivery pipe 29, one of which, in Fig. 2, is shown as extended to a journal 30.

Working in each pump barrel 23 is an ejecting plunger 31, the outer end of which projects always beyond the inner edge of the bar 7, in which it is mounted. To render the plungers subject to the respective cams or eccentrics 13, yoke-like pump-actuating heads 32 are arranged to embrace and to be individually subject to the respective eccentric. The prongs of these yokes 32 are recessed to receive the projecting ends of the plungers 31. Under lubricant ejecting actions, the ends of the plungers will be forced tightly against their seats in the yoke 32.

To insure retracting movements to the said plungers, there is provided a plunger retractor in the form of a metal yoke 33, which, as shown, fits over the corresponding yoke 32 and is provided with forked ends 34 that engage notches or grooves 35 formed in said plungers. The retracting yokes 33 are shown as held to the respective yokes 32 by rectangular metal clips 36, which, in turn, are held in place by machine screws 37 passed therethrough and through the yokes 33, and are screwed into the yokes 32. By reference to Fig. 1, it will be noted that the flat sides of adjacent clips 36 work in close contact so that they hold the yokes 32 upright.

In Fig. 2, the reservoir 5 is shown as provided with a detachable cover 38.

Operation

With the arrangement described, it is evident that when any coupling yoke 32 is moved in one direction, the plunger on the one side will be given a lubricant ejecting movement, and the plunger on the other side will be given a retracting movement. When a plunger is given its retracting movement, it will produce a partial vacuum in its barrel or cylinder until its port 24 is opened and thereupon, lubricant from the reservoir, partly under the action of gravity and partly under the action of suction, will be drawn into said barrel. When a plunger, in its ejecting movement is moved far enough into its barrel or cylinder to close its port 24, the lubricant will be forced under very high pressure (if the resistance to the delivery of lubricant makes high pressure necessary) past the outwardly opening check valve 27 and out through the lubricant delivery pipe 29.

It is highly important here to note that one-half of the plungers of the complete lubricator will be given lubricant ejecting movements on one side, while the other half of the plungers are being given lubricant-ejecting movements on the other side of the lubricator, which causes the thrust or reaction on the crank shaft to be equalized or substantially counteracted. If the complete apparatus is to comprise say twelve lubricant pumps or ejectors, then the eccentrics or cams 13 on the crank shaft should be set progressively thirty degrees in advance, the one of the other; but if, as another example, the lubricator should comprise eighteen of said lubricant pumps or ejectors, then the said eccentric should be set progressively twenty degrees, the one in advance of the other. Such an arrangement gives one complete lubricant-ejecting action for each complete rotation of the crank shaft. Of course, the 360° of a circle, in respect to the number of lubricant pumps or ejectors can be otherwise arranged, but it is highly desirable that the eccentrics or cams of the crank shaft be set progressively in advance by constant variation in degrees.

The fact that all of the exposed movable parts of the lubricator are submerged in the lubricant of the reservoir, or container, assures the best kind of lubrication and reduces friction and wear to a minimum.

A lubricator such as described, will be found serviceable for the lubrication of various different plants or installations such as motor-propelled vehicles, power plants and the like, where a large number of journals, bearings or other devices must be kept lubricated. In this arrangement, of course, the delivery to each journal, bearing or point of delivery is independent of the other and if the conduit to any one of these devices becomes clogged or partially plugged, there is available in the lubricant pumps or ejectors, very high pressure for opening it and making the delivery of the lubricant positive.

To get access to the inner mechanism of the lubricator, for ordinary purposes, it is only necessary to remove the cover 38, but the bottom member 10 and the member 7 can both be readily removed where that becomes desirable, as, for example, if the pump barrels or cylinders or the valve mechanisms require repair.

From the foregoing, it is evident that the device described is capable of various modifications within the scope of the invention herein disclosed and claimed.

What I claim is:

1. A lubricator of the kind described comprising a reservoir, the bottom of which is formed by two opposed transversely opposite and aligned metal bars, and a bowl detachably secured to said bars, said bars being detachably secured to the bottom of said reservoir and each having a plurality of pump barrels and depending valve-equipped discharge conduits, said barrels further having lubricant intake ports located near the bottom of said reservoir, a crank shaft working in the lower portion of said reservoir and provided with eccentric cams set progressively, one in advance of the other, pump plungers working in said barrels with their inner ends projecting into said reservoir, and plunger coupling devices actuated one by each of said eccentric cams and connecting the opposed plungers in opposed pairs.

2. The structure defined in claim 1 in which said plunger coupling devices are in the form of yokes having means for detachably connecting the opposed plungers thereto.

3. A lubricator of the kind described comprising a reservoir, a crank shaft working in said reservoir and having eccentric cams set progressively, one in advance of the other, two series of lubricant pump barrels exposed in said reservoir, one series on each side of said crank shaft, said barrels having intake and discharge ports, outwardly opening check valves in the lubricant discharge passages from said barrels, plungers working in said barrels, and yokes subject to the respective eccentric cams of said crank shaft, coupling together in pairs the diametrically opposite plungers of the two series, in further combination with yoke-like lock members detachably secured to the respective yokes and having interlocking engagement with the diametrically opposite plungers of said two series.

4. A lubricator of the kind described comprising a reservoir, a plurality of lubricant pump barrels exposed in said reservoir and having lubricant intake and outlet ports, outwardly opening check valves in the lubricant discharge passages from said barrels, plungers working in said barrels, a crank shaft working in said reservoir and having eccentric cams set progressively the one in advance of the other, and yokes connected to the projecting ends of said plungers and actuated by the respective cams of said crank shaft, said yokes being placed in side by side contact and being carried entirely by the opposed plungers to which they are connected.

BERNARD GUNDERSON.